United States Patent
Ramos-Martinez et al.

(10) Patent No.: US 9,829,592 B2
(45) Date of Patent: Nov. 28, 2017

(54) SEISMIC IMAGING WITH VISCO-ACOUSTIC REVERSE-TIME MIGRATION USING PSEUDO-ANALYTICAL METHOD

(71) Applicant: PGS Geophysical AS, Lilleaker, Oslo (NO)

(72) Inventors: Jaime Ramos-Martinez, Katy, TX (US); Alejandro A. Valenciano Mavilio, Bellaire, TX (US)

(73) Assignee: PGS Geophysical AS, Oslo (NO)

( * ) Notice: Subject to any disclaimer, the term of this patent is extended or adjusted under 35 U.S.C. 154(b) by 229 days.

(21) Appl. No.: 14/850,540

(22) Filed: Sep. 10, 2015

(65) Prior Publication Data

US 2016/0170059 A1 Jun. 16, 2016

Related U.S. Application Data

(60) Provisional application No. 62/092,579, filed on Dec. 16, 2014, provisional application No. 62/140,357, filed on Mar. 30, 2015.

(51) Int. Cl.
*G01V 1/28* (2006.01)
*G01V 1/36* (2006.01)
*G01V 1/38* (2006.01)

(52) U.S. Cl.
CPC .............. *G01V 1/368* (2013.01); *G01V 1/282* (2013.01); *G01V 1/3808* (2013.01); *G01V 2210/679* (2013.01); *G01V 2210/74* (2013.01)

(58) Field of Classification Search
CPC ..... G01V 1/282; G01V 1/30; G01V 2210/679

USPC ...................... 367/50–51, 73; 702/14, 16, 17
See application file for complete search history.

(56) References Cited

U.S. PATENT DOCUMENTS

| | | |
|---|---|---|
| 6,466,873 B2 | 10/2002 | Ren et al. |
| 8,451,685 B2 | 5/2013 | Saenger et al. |
| 2010/0088035 A1 | 4/2010 | Etgen et al. |
| 2010/0110832 A1 | 5/2010 | Valenciano et al. |

(Continued)

OTHER PUBLICATIONS

Bai et al., "Attenuation-compensation in viscoacoustic reverse time migration", 2013 Annual SEG meeting, Houston, TX, DOI http://dx.doi.org/10.1190/segam2013-1252.1*

(Continued)

*Primary Examiner* — Ian J Lobo

(57) ABSTRACT

In one embodiment, a reverse time migration module is configured with a visco-acoustic wave equation for media with heterogeneous attenuation solved using a pseudo-analytical method. Seismic data is obtained for a zone of interest, and a model is created for the zone of interest. The model has spatial variability in velocity and quality factor. Pseudo-analytic Q-compensating reverse time migration (PA-Q-RTM) is performed using the reverse time migration module and the model for the zone of interest to obtain PA-Q-RTM seismic data. In another embodiment, a system for processing seismic data includes a reverse time migration module configured with a visco-acoustic wave equation that is solved from the pseudo-analytical method. The system operates to obtain seismic data for a zone of interest and perform PA-Q-RTM using a model for the zone of interest to obtain PA-Q-RTM seismic data for the zone of interest. Other embodiments and features are also disclosed.

21 Claims, 8 Drawing Sheets

(56) References Cited

U.S. PATENT DOCUMENTS

2012/0243371 A1* 9/2012 Zhang .................. G01V 1/282
367/43
2015/0078124 A1 3/2015 Lu et al.

OTHER PUBLICATIONS

Zhang et al (2010), Compensating for visco-acoustic effects in reverse-time migration. SEG Technical Program Expanded Abstracts 2010: pp. 3160-3164.*

Tieyuan Zhu, et al. "Q-compensated reverse-time migration", May-Jun. 2014, pp. S77-S87, Geophysics vol. 79, No. 3.

Tieyuan Zhu, et al. "Modeling wave propagation in heterogeneous attenuating media using decoupled fractional Laplacians", May-Jun. 2014, pp. T105-T116, Geophysics vol. 79, No. 3.

Chunlei Chu, et al. "Application of normalized pseudo-Laplacian to elastic wave modeling on staggered grids", Sep.-Oct. 2011, pp. T113-T121, Geophysics vol. 76, No. 5.

Jose M. Carcione "A generalization of the Fourier pseudospectral method", Nov.-Dec. 2010, pp. A53-A56, Geophysics vol. 75, No. 6.

Helga Emmerich, et al "Incorporation of attenuation into time-domain computations of seismic wave fields", Sep. 1987, pp. 1252-1264, Geophysics vol. 52, No. 9.

Einar Kjartansson "Constant Q-Wave Propagation an dAttenuation", Aug. 10, 1979, pp. 4737-4748, Journal of Geophysical Research, vol. 84, No. B9.

John T. Etgen, et al. "The pseudo-analytical method: application of pseudo-Laplacian to acoustic and acoustic anisotropic wave propagation", 2009, pp. 2552-2556, SEG Houston International Exposition and Annual Meeting.

W. Chen et al. "Fractional Laplacian time-space models for linear and nonlinear lossy media exhibiting arbitrary frequency power-law dependency", Apr. 2004, pp. 1424-1430, J. Acoust. Soc. Am., vol. 115, No. 4.

Sean Crawley, et al. "TTI reverse time migration using the pseudo-analytic method", Nov. 2010, pp. 1378-1384, Special Section: Reverse Time Migration.

* cited by examiner

SEISMIC IMAGING WITH VISCO-ACOUSTIC REVERSE-TIME MIGRATION USING PSEUDO-ANALYTICAL METHOD

CROSS-REFERENCE TO RELATED APPLICATION(S)

The present patent application claims the benefit of U.S. Provisional Patent Application No. 62/092,579, filed Dec. 16, 2014, the disclosure of which is hereby incorporated by reference. The present patent application also claims the benefit of U.S. Provisional Patent Application No. 62/140,357, filed Mar. 30, 2015, the disclosure of which is hereby incorporated by reference.

BACKGROUND

In seismic surveying, seismic data may be acquired by imparting acoustic energy into the Earth near its surface, and detecting acoustic energy that is reflected from boundaries between different layers of a subterranean formation. Acoustic energy is reflected when there is a difference in acoustic impedance between adjacent layers to a boundary. Signals representing the detected acoustic energy are interpreted often with seismic imaging to infer structures and composition of the subterranean formation, thereby to aid in the identification and production of hydrocarbons.

In marine seismic surveying, a seismic energy source, such as an air gun, or air gun array, marine vibrator, or marine vibrator array, is typically used to impart the acoustic energy into the subterranean formations below the bottom of a body of water. The seismic energy source is actuated at a selected depth in the water, typically while the seismic energy source is being towed by a vessel. The same or a different vessel tows one or more seismic sensor cables, called streamers, in the water. Generally the streamers extend behind the vessel along the direction in which the streamer is towed. Typically, a streamer includes a plurality of sensors, such as hydrophones, for example, disposed on the cable at spaced apart, known positions along the cable. Hydrophones are sensors that generate an optical or electrical signal corresponding to the pressure of the water or the time gradient of pressure in the water. The vessel that tows the one or more streamers typically includes recording equipment to make a record, indexed with respect to time, of the signals generated by the sensors in response to the detected acoustic energy. The record of signals may be processed and analyzed with seismic imaging to infer structures of and compositions of the subterranean formations below the locations at which the seismic survey is performed.

BRIEF DESCRIPTION OF THE DRAWINGS

The invention and its advantages may be more easily understood by reference to the following detailed description and the attached drawings, in which.

DETAILED DESCRIPTION

This disclosure is related generally to the field of seismic data acquisition, such as marine surveying. Seismic data acquisition can include, for example, seismic or electromagnetic surveying. For example, this disclosure may have applications in marine surveying, in which one or more sources are used to generate wave-fields, and sensors that can receive energy generated by the sources and affected by the interaction with a subterranean formation.

Various techniques can be used for evaluation of a subterranean formation. For instance, a seismic energy source can be used to generate a seismic signal. The seismic signal can propagate into the subterranean formations and be at least partially reflected by subsurface seismic reflectors, such as interfaces between subterranean formations having different acoustic impedances. The reflections can be recorded by seismic sensors, and the resulting seismic data may be processed and analyzed with seismic imaging to yield information relating to the location of the subsurface reflectors and the physical properties of the subterranean formation.

However, there may be a number of challenges associated with seismic surveying. For instance, seismic waves can lose high frequency energy as they travel through the subterranean formations, which may cause amplitude-loss and dispersion.

Figure 1:
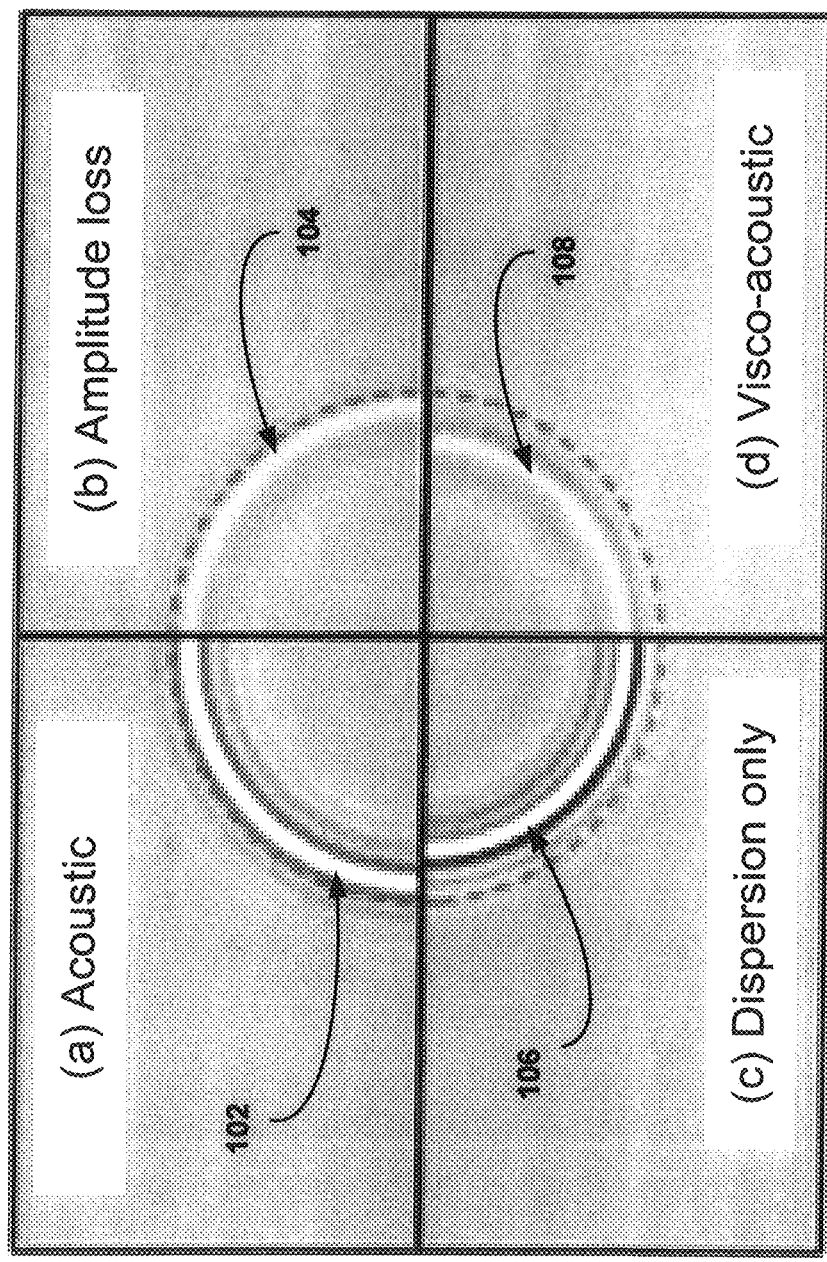
FIG. 1 depicts a wave front propagated through four different types of media in accordance with an embodiment of the invention.

To illustrate attenuation and dispersion of seismic waves, FIG. 1 depicts a wave front propagating from the seismic energy source located at the center of the diagram through a homogeneous background velocity space. Each quadrant corresponds to a snapshot captured at the same traveling time in (a) an acoustic medium; (b) an amplitude-loss only medium; (c) a dispersive only medium; and (d) a both amplitude-loss and dispersion medium (i.e., visco-acoustic). In these simulations, the reference frequency is higher than the frequency content of the source wavelet used in the simulations.

As seen in FIG. 1, the wave front travels less far in a same amount of time (i.e. with a slower velocity, seen as less far out from the center) in the dispersion only (wave front 106) and visco-acoustic media (wave front 108) than in the acoustic (wave front 102) and amplitude-loss only (wave front 104) media. As further seen, the amplitude of the wave front is reduced (i.e. has a smaller magnitude, seen as less bright) in the amplitude-loss only (wave front 104) and visco-acoustic media (wave front 108) than in the acoustic (wave front 102) and dispersion only (wave front 106) media.

Seismic waves traveling through subterranean formations are both attenuated and dispersed. Hence, to accurately perform seismic imaging, both amplitude loss and phase distortion (dispersion) should be compensated in propagating seismic waves. This can be done by modeling wave propagation in a visco-acoustic medium.

Two main wave equation migration methods can be used to compensate for visco-acoustic effects: one-way wave equation migration; and two-way wave equation migration. In the case of one-way wave equation migration, the propagation is performed in the frequency domain, and visco-acoustic effects may be compensated for by turning the phase velocity into a complex quantity. Amplitude-loss and dispersion are split more naturally in the frequency domain. In the case of two-way wave equation migration, visco-acoustic forward-propagated and back-propagated wave-fields are generally computed by solving the wave equation in the time domain. This implies a more elaborate implementation if the effects mentioned above are separated. In addition, it is challenging to find a good compromise between efficiency in the computations and accuracy of the constant-Q behavior within the seismic frequency bandwidth. Approaches based on the exact constant-Q model depend upon the calculation of fractional time derivatives arising in the visco-acoustic wave equation derivation. However, accurate computation of these fractional derivatives in time typically requires the use of large memory resources.

An alternative approach is to simulate attenuation from fractional wave equations by translating the fractional time derivative into the Laplacian, which is easily computed in the Fourier domain. Initial efforts using this concept did not split the effects of dispersion and absorption into different operators and so were inconvenient for practical implementations. A subsequent effort derived and solved a wave equation in the Fourier domain which split those terms but had limited accuracy due, at least in part, to its use of a single value for γ computed from an average of different Q values of the model. Unfortunately, use of a single average value for γ (i.e. a constant Q) compromises the accuracy of the arrival times of the different events.

The technique disclosed herein advantageously provides accurate arrival times of events in Q-variable media. Advantageously, the use of coarse computational grids and large time stepping is allowed because the wave-equation derived and described herein is solved within the framework of the pseudo-analytical (PA) method. An implementation of the PA method is disclosed, for example, in "The pseudo-analytical method: application of pseudo-Laplacians to acoustic and acoustic anisotropic wave propagation," by John T. Etgen and Sverre Brandsberg-Dahl, Society of Exploration Geophysicists, International Exposition and Annual Meeting, Houston 2009, pp. 2552-2556. Use of the approach taught in the present disclosure advantageously improves on the pseudo-analytical method by enabling the compensation of amplitude loss and phase distortion in visco-acoustic media without requiring a prohibitive amount of computations or memory resources.

Figure 2:
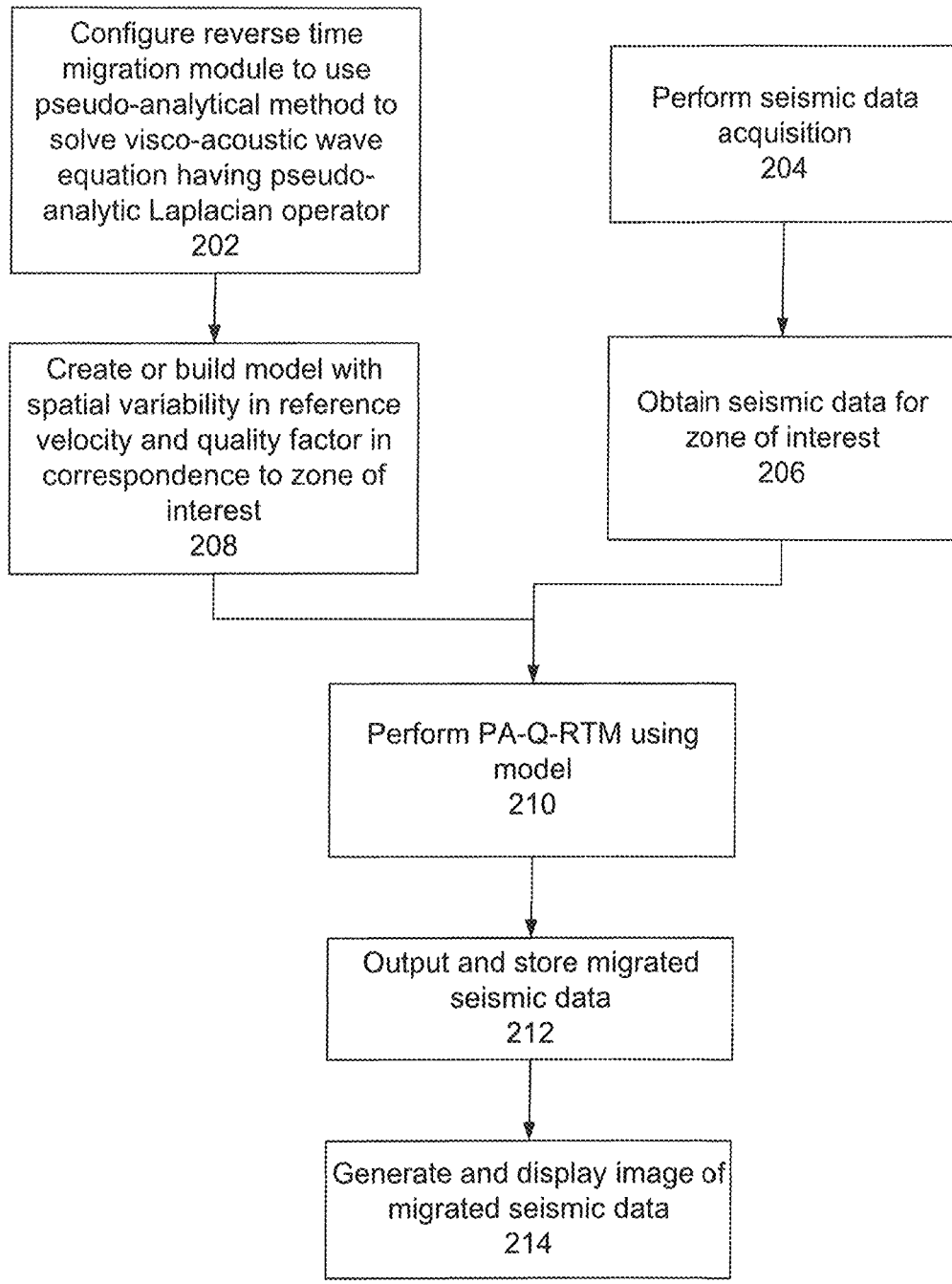
FIG. 2 is a flow chart of a method of seismic imaging using reverse time migration (RTM) with visco-acoustic loss compensation in accordance with an embodiment of the invention.

FIG. 2 is a flow chart of a method 200 of seismic imaging using reverse time migration (RTM) with compensation for visco-acoustic effects in accordance with an embodiment of the invention. The method 200 may be used with either streamer-based or land-based seismic data acquisition (e.g., seismic surveying).

Per step 202, a RTM module of a seismic data processing system may be programmed or configured with a visco-acoustic wave equation that includes a pseudo-analytic form of a Laplacian operator (or extrapolator) for compensating visco-acoustic loss. The following is a discussion of an exemplary implementation of the visco-acoustic wave equation that is programmed or configured into the RTM module in accordance with an embodiment of the invention.

Assuming the constant-Q dispersion relation, consider the following two-way wave equation for visco-acoustic isotropic heterogeneous media with constant density.

$$\frac{1}{c_0^2}\frac{\partial^2 \sigma(x,t)}{\partial t^2} = \eta(x)(-\nabla^2)^{\gamma+1}\sigma(x,t) + \tau(x)\frac{\partial}{\partial t}(-\nabla^2)^{\gamma+1/2}\sigma(x,t), \quad (1)$$

where σ is pressure, and the coefficients as a function of space x are defined as $\eta(x)=-c_0^{2\gamma(x)}\omega_0^{-2\gamma(x)}\cos(\pi\gamma(x))$, $\tau(x)=-c_0^{2\gamma(x)-1}\omega_0^{-2\gamma(x)}\sin(\pi\gamma(x))$, where $\gamma=\pi^{-1}\tan^{-1}(1/Q)$. Q is the quality factor, $c_0$ and $\omega_0$ are the reference velocity and frequency, respectively.

As mentioned above, an advantage of Equation (1) for migration is that in the right-hand term, the dispersive (first) and amplitude-loss (second) operators are split. (The amplitude-loss operator may also be referred to as the attenuation operator.) However, a drawback to Equation (1) is that, when computing the dispersive operator $\eta(x)(-\nabla^2)^{\gamma+1}\sigma(x,t)$ for heterogeneous (Q) media in the wavenumber domain, there is ambiguity regarding the value of the exponent γ+1 that should be used to compute the operator in the wavenumber domain. One possibility is that γ may be computed from an average of the different Q values. Unfortunately, use of a single average Q value for computing γ compromises the accuracy of the arrival times of the different events. This is the case even for waves that are propagated through media with no attenuation losses.

The present disclosure provides an efficient and accurate solution to the above problem. Consider the following frequency (ω)-wavenumber (k) version of Equation (1).

$$\frac{\omega^2}{c^2} \approx \eta(k^2)^{\gamma+1} + (i\omega)\tau(k^2)^{\gamma+1/2} \quad (2)$$

A function (represented by L) of any variable (γ in this case) may be approximated around a certain value $\gamma=\gamma_0$ as follows.

$$L(\gamma) \approx L(\gamma_0) + \Delta L(\gamma) \quad (3)$$

Hence, we approximate the first term in the right-side of Equation (2) (i.e. the dispersive operator) around γ=0 as follows.

$$\eta(k^2)^{\gamma+1} \approx \eta(k^2) + \eta\gamma(k^2)[\log(k^2)] \quad (4)$$

Thus, the present disclosure provides an approximate solution in which the variability of the pseudo-Laplacian operator $k^2$ as a function of γ in the wavenumber domain is advantageously eliminated. The variability of the pseudo-Laplacian operator $k^2$ as a function of γ (i.e. as a function of Q) is, instead, applied in the space domain.

In order to solve this equation within the context of the pseudo-analytical method, we use the concept of normalized pseudo-Laplacian. Since the first-order time-derivative in the second term on the right-side of Equation (1) (i.e. the amplitude-loss operator) affects only the amplitude of the wave field, the pseudo-analytic form of the Laplacian operator is still valid to correct for the error incurred when the second-order time derivative on the left-side of Equation (1) is approximated with a second-order finite difference. Approximating the second-order time derivative with a second-order finite difference results in the following new visco-acoustic wave equation that is expressed in a time-discretized pseudo-analytic form.

$$\sigma^{n+1}=2\sigma^n-\sigma^{n-1}+\Delta t^2 c_0^2(x)\eta(x)FT^{-1}\{\tilde{f}(k)\sigma^n(k,t)\}+$$
$$\Delta t^2 c_0^2(x)\eta(x)\gamma(x)FT^{-1}\{[\tilde{f}(k)\log(\tilde{f}(k))]\sigma^n(k,t)\}+$$
$$\Delta t^2 c_0^2(x)\tau(x)[FT^{-1}\{(\tilde{f}(k))^{\gamma+1/2}\sigma^n(k,t)\}-FT^{-1}\{(\tilde{f}(k))^{\gamma+1/2}\sigma^{n-1}(k,t)\}] \quad (5)$$

where n and $\Delta t$ are the time stepping index and size, respectively, k is the wavenumber, and $FT^{-1}$ represents the inverse Fourier Transform and the normalized pseudo-analytic Laplacian is defined as:

$$\tilde{f}(k) = \frac{2\cos(c_0\Delta t|k|) - 2}{-c_0^2 \Delta t^2 |k|^2} \quad (6)$$

Note that, in Equation (5), the dispersive operator is $c_0^2(x)\eta(x)FT^{-1}\{\tilde{f}(k)\sigma^n(k,t)\}+c_0^2(x)\eta(x)\gamma(x)FT^{-1}\{[\tilde{f}(k)\log(\tilde{f}(k))]\sigma^n(k,t)\}$, and the attenuation or amplitude-loss operator is $c_0^2(x)\tau(x)[FT^{-1}\{(\tilde{f}(k))^{\gamma+1/2}\sigma^n(k,t)\}-FT^{-1}\{(\tilde{f}(k))^{\gamma+1/2}\sigma^{n-1}(k,t)\}]$, wherein $\sigma^n(k,t)$ is the wave field in discrete form with discrete time variable n, x is a spatial vector, $FT^{-1}$ is an inverse Fourier transform, $\eta(x)=-c_0^{2\gamma(x)}\omega_0^{-2\gamma(x)}\cos(\pi\gamma(x))$, $\omega_0$ is a reference frequency corresponding to the reference velocity $c_0$, $\gamma(x)=\pi^{-1}\tan^{-1}(1/Q(x))$, and $Q(x)$ is the quality factor as a function of the spatial vector x. One of the advantages of a visco-acoustic wave equation in the form shown in Equations (1) and (5) is that the same algorithm may be used for forward modeling and RTM extrapolation with only a change of sign in the amplitude-loss term.

Returning to FIG. 2, seismic data acquisition for a volume of subterranean formations may be performed per step 204. In one embodiment, the seismic data acquisition is a streamer-based marine seismic survey. An exemplary apparatus for streamer-base seismic data acquisition is described below in relation to FIG. 3. In an alternate embodiment, the seismic data acquisition may be land-based. The seismic data acquisition of step 204 may be performed independently from the other steps in method 200 of seismic imaging.

Per step 206, a portion of the seismic data corresponding to a zone of interest may be obtained in a format for processing by a seismic data processing system (e.g., digital or analog). The seismic data processing system may be on a vessel, offshore rig, at a data processing center, or other facility. Note that some process steps may be performed in the field prior to the seismic data being transferred to the seismic data processing system. The seismic data processing system may provide more computing resources and also advanced data processing modules, such as the RTM module with the visco-acoustic wave equation disclosed herein. A simplified diagram of a computer system that may be used at a seismic data processing system to perform computational method steps is described below in relation to FIG. 4.

Figure 5:
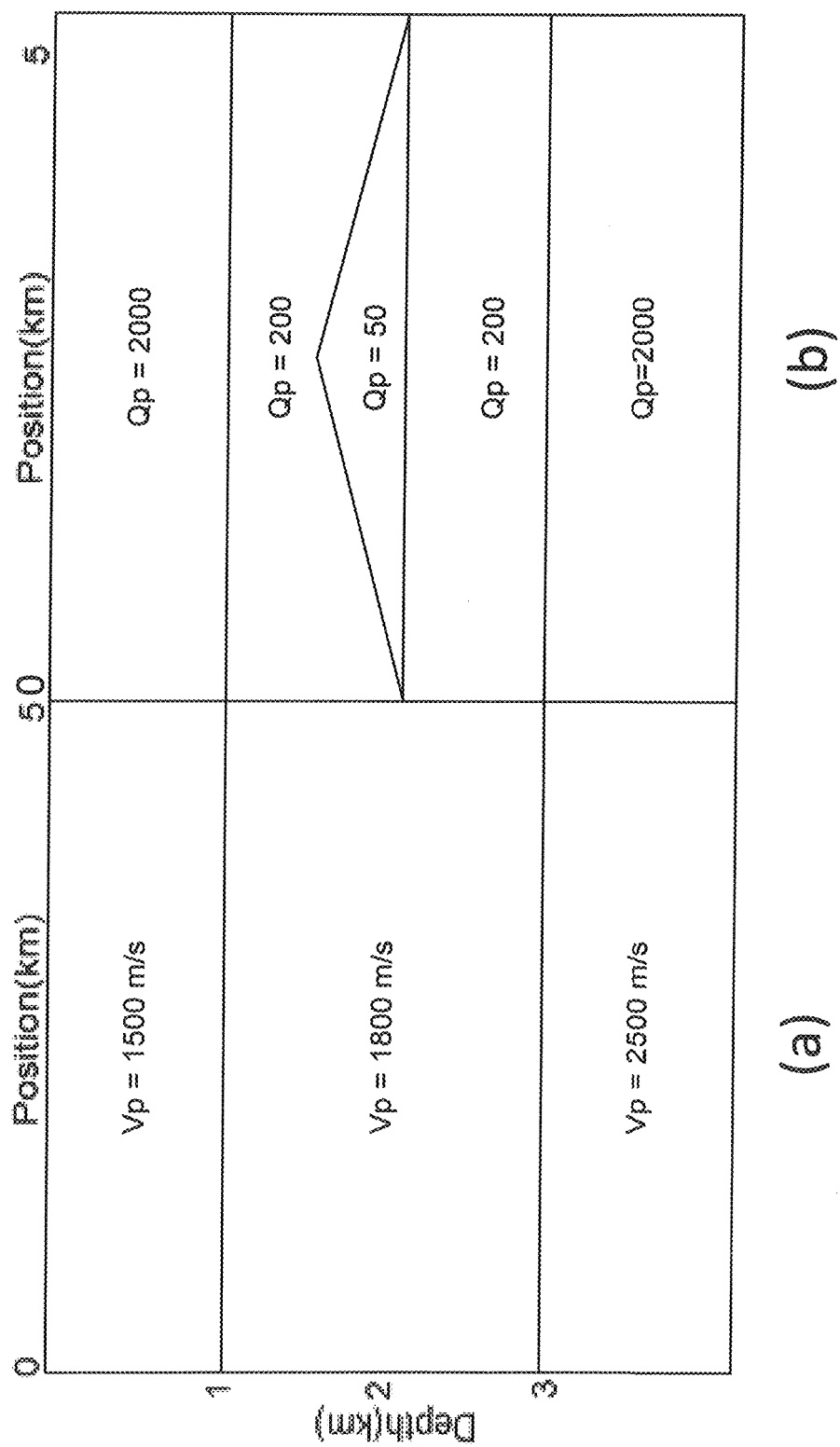
FIG. 5 depicts a simple velocity model of a subterranean formation with three layers and quality factor (Q) that spatially varies in accordance with an embodiment of the invention.

Furthermore, per step 208, a model with having spatial variability in the reference velocity and quality factor (Q) may be created or built in correspondence to the zone of interest. The model associates different reference velocities and Q values with sections or layers of subterranean formations within the zone of interest. A simple example of such model is described below in relation to FIG. 5. As depicted in FIG. 5, the model may be heterogeneous in velocity and Q, and may contain as much complexity as that observed in a real subterranean formation of economic interest.

Per step 210, pseudo-analytical Q-compensating RTM (PA-Q-RTM) may be performed by the RTM module using the spatial velocity and quality factor model to obtain migrated seismic data for the zone of interest. In accordance with an embodiment of the invention, the RTM module is configured, as discussed above in relation to step 202, to perform the RTM using a visco-acoustic wave equation having normalized pseudo-analytic (PA) Laplacian operators.

As a result of step 210, the migrated seismic data may be output and stored, per step 212. In this case, the migrated seismic data may be referred to as PA-Q-RTM seismic data.

Per step 214, an image of the PA-Q-RTM seismic data may then be generated and displayed as a PA-Q-RTM image, for example, by the seismic data processing system. An example of a PA-Q-RTM seismic image based on the model in FIG. 5 is described below in relation to panel (c) of FIG. 6.

Advantageously, the PA-Q-RTM seismic data generated by the presently-disclosed technique may give a highly accurate solution in a heterogeneous (spatial varying velocity and Q) case. This can be observed in the PA-Q-RTM seismic image displayed in FIG. 6.

Figure 7:
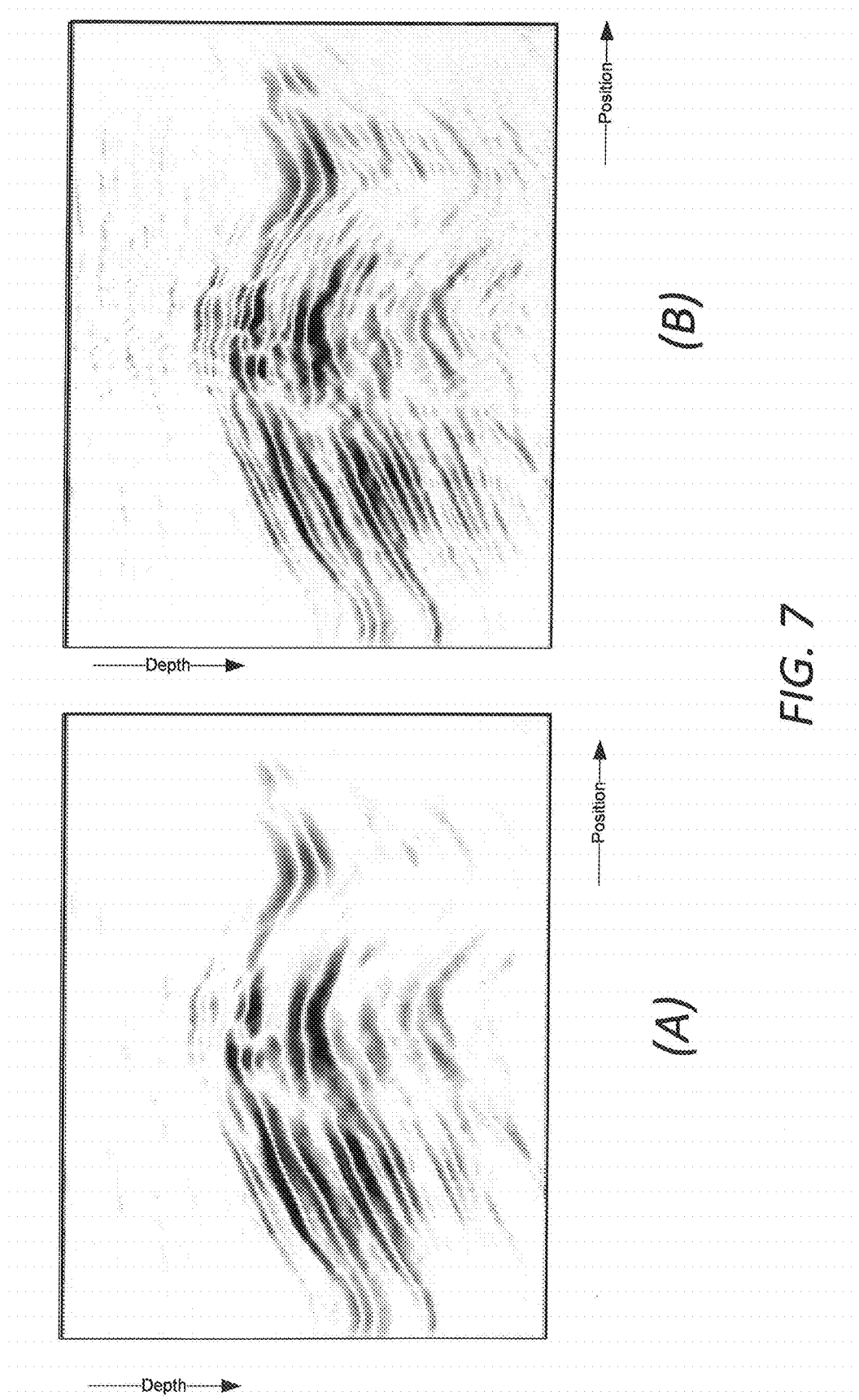
FIG. 7 shows RTM images applied to a field data example without Q-compensation and with Q-compensation in accordance with an embodiment of the invention.

Furthermore, the PA-Q-RTM seismic data generated by the presently-disclosed technique in a real data example provides improved continuity and resolution in migrated images at the reservoir level due to its Q-compensation. This improvement is depicted in FIG. 7 and is confirmed by the amplitude spectra in FIG. 8.

Figure 3:
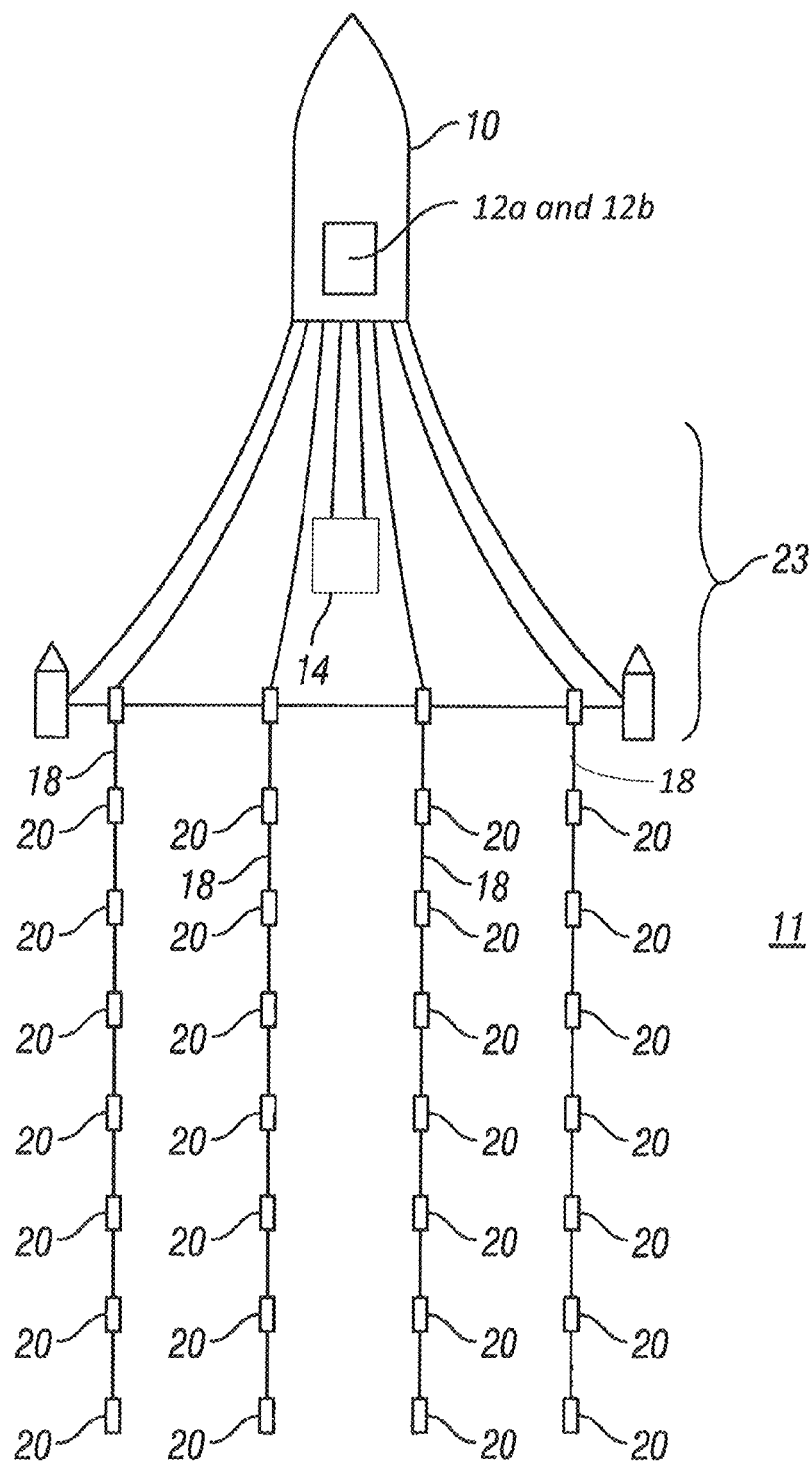
FIG. 3 shows in planar view an example system for three-dimensional seismic data acquisition in accordance with an embodiment of the invention.

FIG. 3 shows in planar view an example system for three-dimensional seismic data acquisition in accordance with an embodiment of the invention. The acquired seismic sensor data is three-dimensional in that it includes data from wavefields traveling in both inline and crossline directions. A vessel 10 moves along the surface of a body of water 11, such as a lake or the ocean, in the inline direction. The illustrated arrangement provides for the towing of a seismic energy source 14 and a plurality of laterally spaced apart streamers 18 (spaced apart in the crossline direction).

The streamers 18 may be maintained in their relative lateral and longitudinal positions with respect to the vessel 10 using towing equipment 23. Each streamer 18 may include a plurality of longitudinally spaced-apart seismic sensors 20 thereon. Other seismic sensor arrangements may be used in other embodiments. As would be understood by one of ordinary skill in the art with the benefit of this disclosure, any wide azimuth array configuration may be suitable for seismic data acquisition, including configurations where the seismic sensor array is towed along a curved path, and including configurations wherein the seismic sensor array not towed, but rather is located at or near the seafloor.

In one embodiment, each seismic sensor 20 may be a dual-sensor device. The dual-sensor device may include, for example, a pressure sensor and a vertical velocity sensor. Other multiple-sensor devices or multiple single-sensor devices may be used in alternate embodiments. As would be understood by one of ordinary skill in the art with the benefit of this disclosure, suitable alternatives to dual-sensor seismic data acquisition would be any multi-sensor seismic data acquisition which allows a mathematical separation of the up-going wavefields and down-going wavefields.

The vessel 10 may include a control system 12a and a recording system 12b. The control system 12a and the recording system 12b may be separate systems that communicate data between each other, or they may be subsystems of an integrated system. The control system 12*a* may be configured for selectively actuating the seismic energy source 14, while the recording system 12*b* may be configured for recording the signals generated by seismic sensors (for example, seismic sensors 20) in response to the seismic energy imparted into the body of water 11 and thereby into subterranean formations below the water bottom. The recording system 12*b* may be further configured to determine and record the geodetic positions of the seismic energy sources and the plurality of seismic sensors at any time.

Source actuation and signal recording by the array of seismic sensors may be repeated a plurality of times while the vessel moves through the water. Each shot record may include, for each seismic sensor, signals corresponding to the seismic energy produced by the seismic energy source.

The seismic data obtained in performing a seismic survey, representative of the subterranean formations, may be processed to yield information relating to the geologic structure and properties of the subterranean formations in the area being surveyed. The processed seismic data may be further processed for display and analysis of potential hydrocarbon content of these subterranean formations.

One goal of seismic data processing is to extract from the seismic data as much information as possible regarding the subterranean formations in order to adequately image the geologic subsurface. In order to identify locations in the subterranean formations where there is a probability for finding petroleum accumulations, large sums of money are expended in gathering, processing, and interpreting seismic data. The determination of the reflector surfaces in a model defining the subterranean formation layers of interest from the recorded seismic data enables the generation of images of the subterranean formations in depth or time.

Images of the structure of the subterranean formations may be produced in order to enable an interpreter to select locations with the greatest probability of having petroleum accumulations. To verify the presence of petroleum, a well is generally drilled. Drilling wells to determine whether petroleum deposits are present, is an extremely expensive and time-consuming undertaking. For that reason, there is a continuing need to improve the processing and display of the seismic data, so as to produce an image of the structure of the subterranean formations that will improve the ability of an interpreter, whether the interpretation is made by a computer or a human, to assess the probability that an accumulation of petroleum exists at a particular location in the subterranean formations. The processing and display of acquired seismic data facilitates more accurate decisions on whether and where to drill, and thereby reduces the risk of drilling dry holes.

In accordance with an embodiment of the invention, a geophysical data product may be produced. The geophysical data product may include geophysical data, such as wavefield data, angle gathers, stacked images, seismic data or images, PA-Q-RTM seismic data or images, images of the structure of the subterranean formations, and/or other data processed using the technique disclosed herein. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis and/or seismic imaging may be performed on the geophysical data product.

Figure 4:
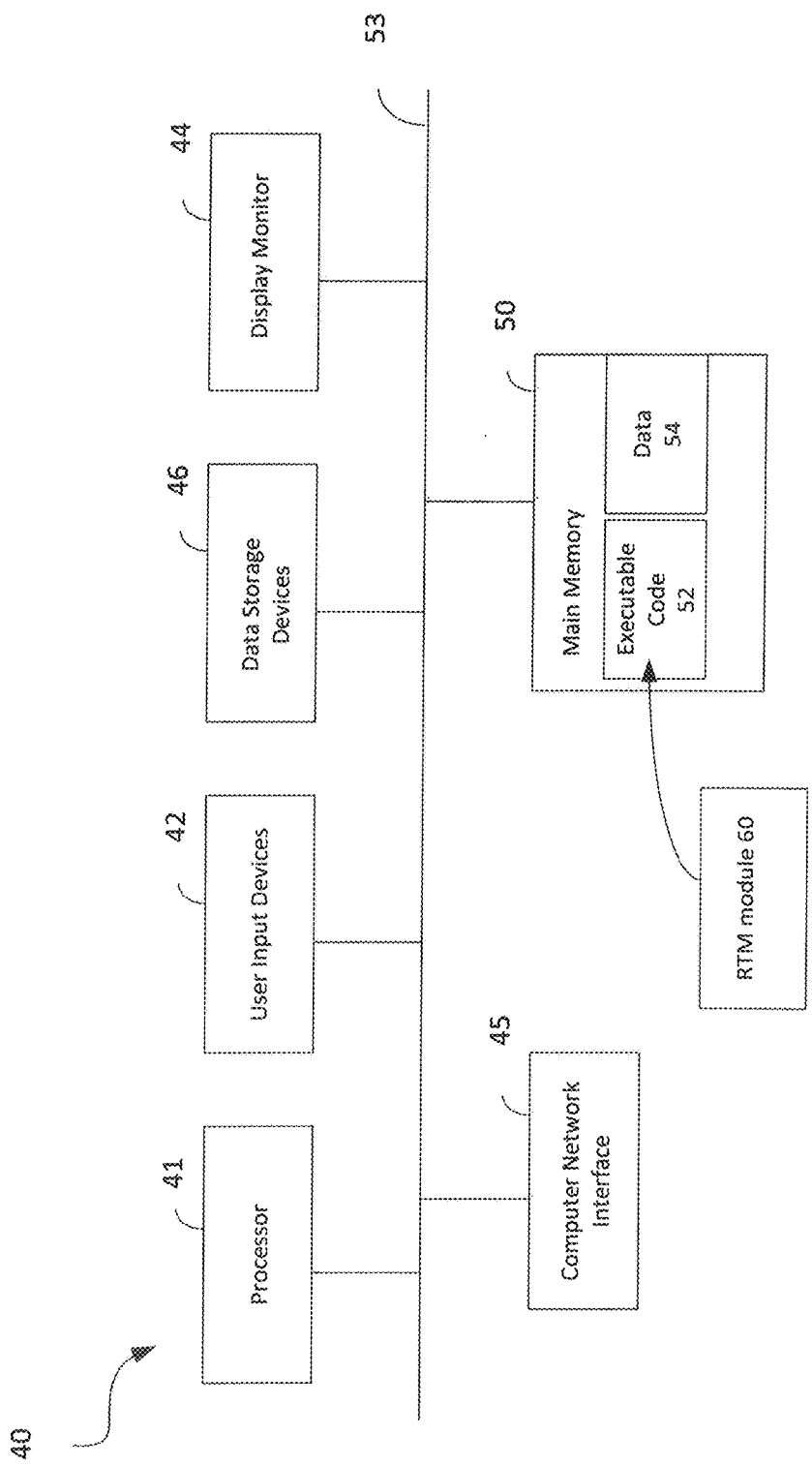
FIG. 4 shows a simplified diagram of a computer system that may be used at a seismic data processing system to perform computational method steps in accordance with an embodiment of the invention.

FIG. 4 shows a simplified example of a computer system 40 which may be used in performing steps for processing seismic data disclosed herein in accordance with an embodiment of the invention. The computer system 40 may be configured with executable instructions so as to perform the data processing methods described herein. This figure shows just one example of a computer which may be used to perform the data processing methods described herein. Other types of computers may also be employed, such as multi-processor computers, server computers, cloud computing via a computer network, and so forth.

The computer system 40 may include a processor 41, such as those from the Intel Corporation of Santa Clara, Calif., for example. The computer system 40 may have a bus system 43 communicatively interconnecting its various components. The computer system 40 may include one or more user input devices 42 (e.g., keyboard, mouse), a display monitor 44 (e.g., LCD, flat panel monitor, CRT), a computer network interface 45 (e.g., network adapter, modem), and a data storage system which may include one or more data storage devices 46 (e.g., hard drive, solid state memory, optical disk drive, USB memory) and a main memory 50 (e.g., RAM).

In the example shown in this figure, the main memory 50 includes executable code 52 and data 54 stored therein. The executable code 52 may comprise computer-readable program code (i.e., software) components which may be loaded from the data storage device 46 to the main memory 50 for execution by the processor 41. The executable code 52 may be configured to perform computer-implemented steps in the methods described herein. In particular, RTM module 60 of the executable code 52 may be configured with a visco-acoustic wave equation having a pseudo-analytic Laplacian operator per step 202 in FIG. 2. The RTM module 60 may be used to obtain the seismic data per step 206, create the model for the zone of interest per step 208, perform the PA-Q-RTM using the model per step 210, output and store the migrated seismic data per step 212, and further processed and displayed per step 214.

FIG. 5 depicts a simple velocity model of a subterranean formation with three layers (three sections) and quality factor (Q) that spatially varies in accordance with an embodiment of the invention. Each layer is shown going from position 0 to 5 km. The left side (a) of FIG. 5 shows the reference velocity for the layers, and the right side (b) of FIG. 5 shows the quality factor for the layers. As shown, the model has spatial variability in reference velocity and quality factor. More specifically, the model includes a plurality of sections, and wherein the reference velocity and the quality factor vary between different sections of the plurality of sections.

The first layer from depth 0 to 1 km corresponds to the water column, in which the reference velocity Vp=1500 m/s and quality factor Qp=2000. Due to the high Q value, visco-acoustic effects are negligible. The second layer from depth 1 to 3 km has a reference velocity of Vp=1800 m/s and quality factor Qp=200. There is a triangular-shaped low-Q velocity anomaly (Qp=50) that is embedded within the second layer. The third layer below depth 3 km has a reference velocity of Vp=2500 m/s and a quality factor Qp=2000 (high Q value).

Figure 6:
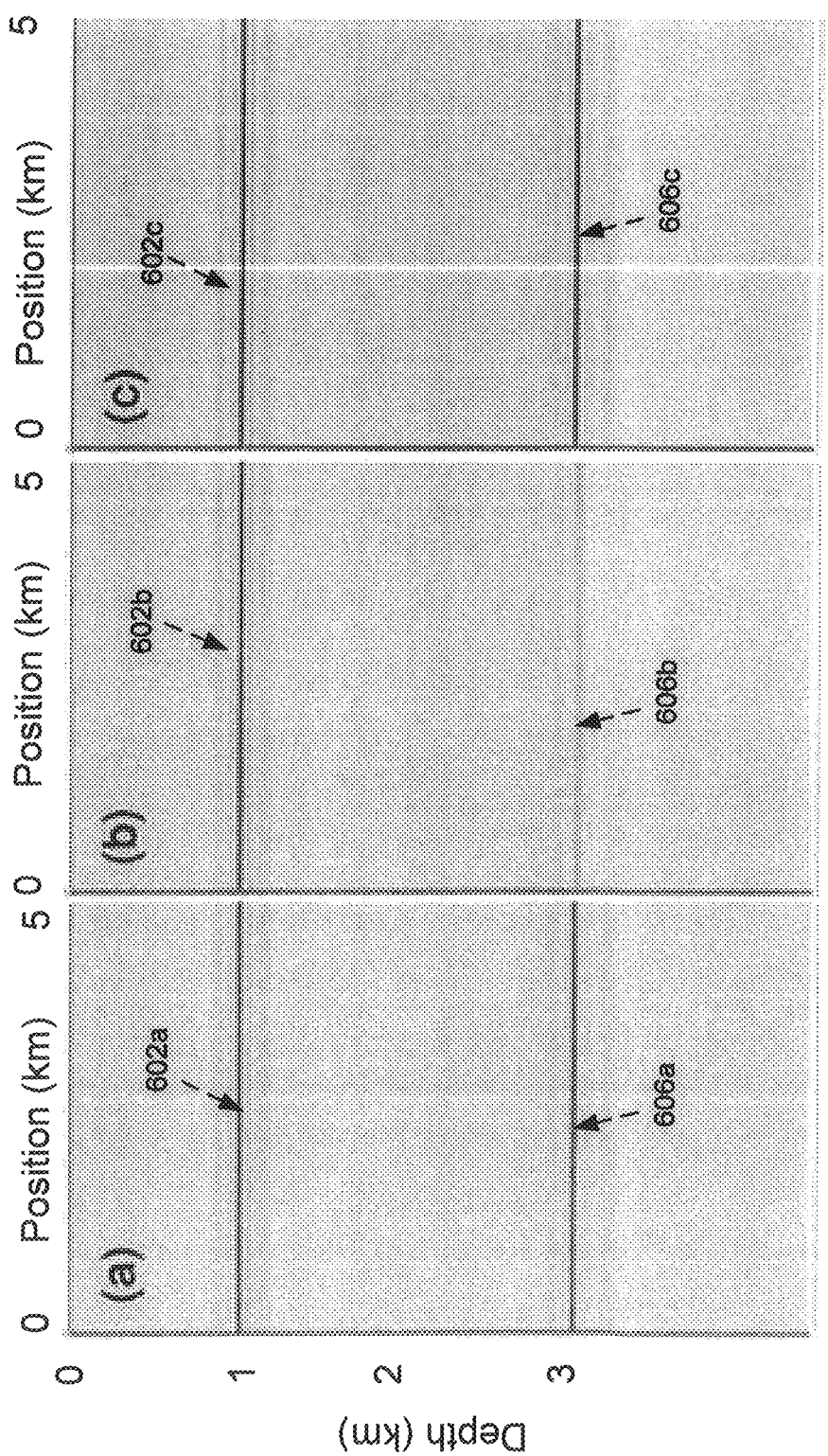
FIG. 6 shows the corresponding RTM images computed from the synthetic acoustic and visco-acoustic data computed from the velocity model of a subterranean formation shown in FIG. 5.

FIG. 6 shows the corresponding RTM images computed from the synthetic acoustic and visco-acoustic data computed from the velocity model of a subterranean formation shown in FIG. 5. Three RTM images are shown in FIG. 6:

(a) acoustic data and acoustic migration; (b) visco-acoustic data and migration without Q-compensation; and (c) visco-acoustic data and migration with Q-compensation using the technique disclosed herein.

Panel (a) of FIG. 6 shows the RTM image for acoustic migration of acoustic data, which is used as a reference. This RTM image clearly shows the first velocity interface 602a between the first and second layers and the second velocity interface 606a between the second and third layers. Panel (b) of FIG. 6 shows the RTM image for migration without Q-compensation of visco-acoustic data. This RTM image shows unaltered the first velocity interface 602b between the first and second layers. However, the second velocity interface 606b between the second and third layers is blurred compared to the second velocity interface 606a in Panel (a). This is because the second velocity interface shows strong phase distortion in addition to significant amplitude decay due to the accumulated effect of Q in the second layer and the low-Q anomaly.

Panel (c) of FIG. 6 shows the PA-Q-RTM seismic image for migration with Q-compensation of visco-acoustic data using the technique disclosed herein. The PA-Q-RTM seismic image shows unaltered the first velocity interface 602c between the first and second layers, and the second velocity interface 606c between the second and third layers at the same location that our reference image. Hence, it is seen that the PA-Q-RTM seismic image indicates the model of FIG. 5 most accurately.

FIG. 7 shows RTM images (A) without Q-compensation and (B) with Q-compensation in accordance with an embodiment of the invention. The migrated images in FIG. 7 have a maximum frequency of 50 Hz and are based on a 3D field dataset that was acquired with dual-sensor technology in the North Sea. The surveyed area is characterized by gas clouds that limit the resolution of conventional seismic images at the depth of the reservoir.

The migrated image (B) with Q-compensation is generated using the PA-Q-RTM technique taught herein (in which the pseudo-analytic Laplacian operator and a model with spatial variability in velocity and Q are used), while the migrated image (A) was computed without Q-compensation. As shown, the migrated image (B) with Q-compensation has greatly improved continuity and resolution at the reservoir level compared to the migrated image (A) without Q-compensation.

Figure 8:
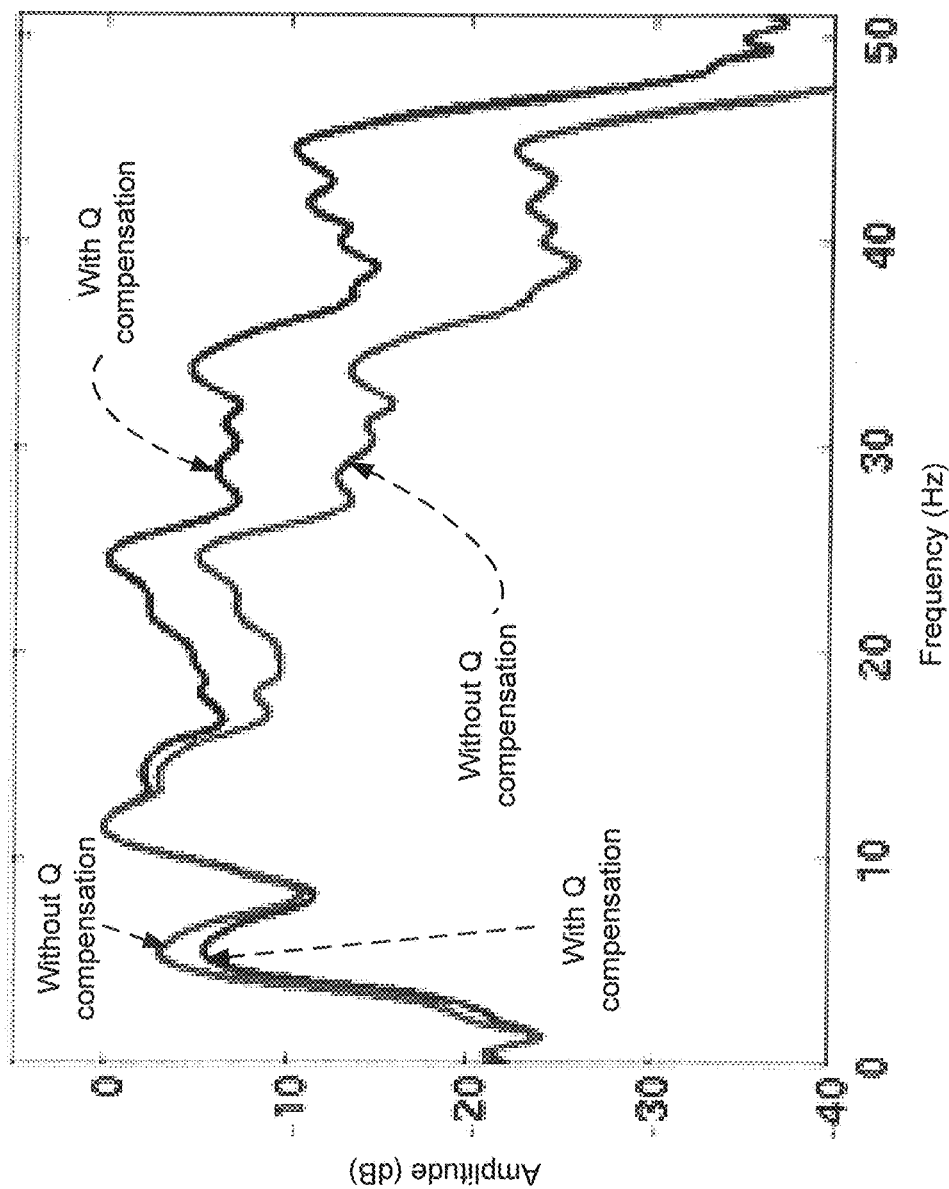
FIG. 8 is a graph of amplitude spectra for the RTM images in FIG. 7 after depth to time conversion.

The amplitude spectra of the images after depth-to-time conversion are shown in FIG. 8. As seen by comparing the amplitude spectra, the migrated image with Q-compensation (i.e. with spatially-variable Q) generated by the presently-disclosed Q-RTM method recovers a substantially greater amount of high-frequency content compared to the migrated image that was computed without Q-compensation (i.e. where computation without Q-compensation assumes a constant infinite Q).

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of seismic imaging using reverse time migration with compensation for visco-acoustic effects, the method comprising:
configuring a reverse time migration module in executable code in memory of a computer system with a visco-acoustic wave equation solved using a pseudo-analytical method, wherein the visco-acoustic wave equation for media with heterogeneous attenuation is time discretized by a second-order finite difference approximation that incurs errors;
obtaining seismic data for a zone of interest, wherein the seismic data is acquired using a seismic energy source and a plurality of towed seismic sensors;
creating a model for the zone of interest by the reverse time migration module in the executable code in the memory of the computer system, wherein the model comprises spatial variability in reference velocity and quality factor;
performing reverse time migration using the reverse time migration module in the executable code in the memory of the computer system to obtain migrated seismic data for the zone of interest; and
generating and displaying an image of the migrated seismic data by the computer system.

2. The method of claim 1, wherein the visco-acoustic wave equation comprises a dispersive operator that simulates wavefields in media with heterogeneity in attenuation and an amplitude-loss operator, and wherein the dispersive and amplitude-loss operators are separate terms in the visco-acoustic wave equation.

3. The method of claim 2, wherein the visco-acoustic wave equation comprises a pseudo-analytic Laplacian operator that compensates for the errors incurred by the time discretization.

4. The method of claim 3, wherein the pseudo-analytic Laplacian operator comprises, in a normalized form, $$\tilde{f}(k) = \frac{2\cos(c_0 \Delta t |k|) - 2}{-c_0^2 \Delta t^2 |k|^2},$$

where $c_0$ is a reference velocity, $\Delta t$ is a time stepping size, and $k$ is a vector in wavenumber space.

5. The method of claim 4, wherein the dispersive operator comprises:

$$c_0^2(x)\eta(x)FT^{-1}\{\tilde{f}(k)\sigma^n(k,t)\} + c_0^2(x)\eta(x)\gamma(x)FT^{-1}\{[\tilde{f}(k)\log(\tilde{f}(k)]\sigma^n(k,t)\},$$

wherein $\sigma^n(k,t)$ is the wave field in discrete form with discrete time variable n, x is a spatial vector, $FT^{-1}$ is an inverse Fourier transform, $\eta(x) = -c_0^{2\gamma(x)}\omega_0^{-2\gamma(x)}\cos(\pi\gamma(x))$, $\omega_0$ is a reference frequency corresponding to the reference velocity $c_0$, $\gamma(x) = \pi^{-1}\tan^{-1}(1/Q(x))$, and $Q(x)$ is the quality factor as a function of the spatial vector x.

6. The method of claim 4, wherein the amplitude-loss operator comprises:

$$c_0^2(x)\pi(x)[FT^{-1}\{(\tilde{f}(k))^{\gamma+1/2}\sigma^n(k,t)\} - FT^{-1}\{(\tilde{f}(k))^{\gamma+1/2}\sigma^{n-1}(k,t)\}]$$

wherein $\sigma^n(k,t)$ is the wave field in discrete form with discrete time variable n, x is a spatial vector, $FT^{-1}$ is an inverse Fourier transform, $\tau(x) = -c_0^{2\gamma(x)-1}\omega_0^{-2\gamma(x)}\sin(\pi\gamma(x))$, $\gamma(x) = \pi^{-1}\tan^{-1}(1/Q(x))$, and $Q(x)$ is the quality factor as a function of the spatial vector x.

7. The method of claim 1, wherein the seismic data is obtained from a marine seismic survey.

8. The method of claim 7, wherein the marine seismic survey includes seismic sensors on towed streamers.

9. The method of claim 1 further comprising performing seismic data acquisition to generate the seismic data.

10. The method of claim 9, wherein the seismic data acquisition includes towing streamers with the plurality of seismic sensors.

11. The method of claim 1, wherein the model comprises a plurality of sections, and wherein the reference velocity and the quality factor vary between different sections of the plurality of sections.

12. The method of claim 1 further comprising producing a geophysical data product.

13. The method of claim 12 further comprising importing the geophysical data product onshore.

14. A system for acquiring, processing and imaging seismic data, the system comprising:
   a seismic data acquisition system comprising a seismic energy source and a plurality of towed seismic sensors;
   data storage, including memory, for storing computer-readable code and data;
   at least one processor configured to execute the computer-readable code; and
   a reverse time migration module in the computer-readable code, wherein the reverse time migration module is configured with a visco-acoustic wave equation that includes a pseudo-analytic Laplacian operator,
   wherein the visco-acoustic wave equation for media with heterogeneous attenuation is time discretized by a second-order finite difference approximation that incurs errors, and
   wherein the system operates to obtain seismic data for a zone of interest and perform reverse time migration using the reverse time migration module and a model for the zone of interest to obtain migrated seismic data for the zone of interest for imaging.

15. The system of claim 14, wherein the model comprises spatial variability in reference velocity and quality factor.

16. The system of claim 15, wherein the model comprises a plurality of sections, and wherein the reference velocity and the quality factor vary between different sections of the plurality of sections.

17. The system of claim 14, wherein the visco-acoustic wave equation comprises a dispersive operator and an amplitude-loss operator, and wherein the dispersive and amplitude-loss operators are separate terms in the visco-acoustic wave equation.

18. The system of claim 17, wherein the pseudo-analytic Laplacian operator comprises, in a normalized form, $$\tilde{f}(k) = \frac{2\cos(c_0 \Delta t |k|) - 2}{-c_0^2 \Delta t^2 |k|^2},$$

where $c_0$ is a reference velocity, $\Delta t$ is a time stepping size, and k is a vector in wavenumber space.

19. The system of claim 18, wherein the dispersive operator comprises:

$$c_0^2(x)\eta(x)FT^{-1}\{\tilde{f}(k)\sigma^n(k,t)\} + c_0^2(x)\eta(x)\gamma(x)FT^{-1}\{[\tilde{f}(k)\log(\tilde{f}(k))]\sigma^n(k,t)\},$$

wherein $\sigma^n(k,t)$ is the wave field in discrete form with discrete time variable n, x is a spatial vector, $FT^{-1}$ is an inverse Fourier transform, $\eta(x) = -c_0^{2\gamma(x)}\omega_0^{-2\gamma(x)}\cos(\pi\gamma(x))$, $\omega_0$ is a reference frequency corresponding to the reference velocity $c_0$, $\gamma(x) = \pi^{-1}\tan^{-1}(1/Q(x))$, and $Q(x)$ is the quality factor as a function of the spatial vector x.

20. The system of claim 19, wherein the amplitude-loss operator comprises:

$$c_0^2(x)\pi(x)[FT^{-1}\{(\tilde{f}(k))^{\gamma+1/2}\sigma^n(k,t)\} - FT^{-1}\{(\tilde{f}(k))^{\gamma+1/2}\sigma^{n-1}(k,t)\}]$$

wherein $\sigma^n(k,t)$ is the wave field in discrete form with discrete time variable n, x is a spatial vector, $FT^{-1}$ is an inverse Fourier transform, $\tau(x) = -c_0^{2\gamma(x)-1}\omega_0^{-2\gamma(x)}\sin(\pi\gamma(x))$, $\gamma(x) = \pi^{-1}\tan^{-1}(1/Q(x))$, and $Q(x)$ is the quality factor as a function of the spatial vector x.

21. A method of manufacturing a geophysical data product, the method comprising:
   obtaining seismic data for the zone of interest, wherein the seismic data is acquired using a seismic energy source and a plurality of towed seismic sensors;
   configuring a reverse time migration module in executable code in memory of a computer system with a visco-acoustic wave equation solved by a pseudo-analytical method, wherein the visco-acoustic wave equation for media with heterogeneous attenuation is time discretized by a second-order finite difference approximation that incurs errors;
   creating a model for the zone of interest by the reverse time migration module in the executable code in the memory of the computer system, wherein the model comprises spatial variability in reference velocity and quality factor;
   performing reverse time migration using the reverse time migration module in the executable code in the memory of the computer system to generate the migrated seismic data for the zone of interest; and
   recording the migrated seismic data for the zone of interest on a tangible computer-readable medium.

* * * * *